United States Patent [19]

Evers

[11] 4,005,142

[45] Jan. 25, 1977

[54] FLUOROCARBON ETHER BIS(O-AMINOPHENOL) COMPOUNDS

[75] Inventor: Robert C. Evers, Dayton, Ohio

[73] Assignee: The United States of America as represented by the Secretary of the Air Force, Washington, D.C.

[22] Filed: Sept. 4, 1975

[21] Appl. No.: 610,470

[52] U.S. Cl. .............................. 260/571; 260/47 R; 260/578

[51] Int. Cl.$^2$ .................. C07C 91/44; C07C 93/14

[58] Field of Search ................................... 260/571

[56] References Cited

UNITED STATES PATENTS

| | | | |
|---|---|---|---|
| 3,903,166 | 9/1975 | Evers ................................. | 260/571 |
| 3,925,312 | 12/1975 | Fletcher ........................ | 260/571 X |

*Primary Examiner*—Daniel E. Wyman
*Assistant Examiner*—Thomas A. Waltz
*Attorney, Agent, or Firm*—Joseph E. Rusz; Cedric H. Kuhn

[57] ABSTRACT

As new compositions of matter, 1,14-bis(3-amino-4-hydroxyphenyl)perfluoro-5,10-dimethyl-3,6,9,12-tetraoxatetradecane and 1,17-bis(3-amino-4-hydroxyphenyl)perfluoro-3,6,9,15-tetraoxaheptadecane. The compounds are useful as monomers in synthesizing perfluoroalkylene ether bibenzoxazole polymers possessing thermooxidative stability and superior low temperature viscoelastic properties.

3 Claims, No Drawings

FLUOROCARBON ETHER BIS(O-AMINOPHENOL) COMPOUNDS

RIGHTS OF THE GOVERNMENT

The invention described herein may be manufactured and used by or for the Government of the United States for all governmental purposes without the payment of any royalty.

FIELD OF THE INVENTION

This invention relates to fluorocarbon ether bis (o-aminophenol)compounds. In one aspect it relates to a process for preparing the compounds.

BACKGROUND OF THE INVENTION

A need exists for thermally stable elastomeric polymers for various aerospace seal and sealant applications. For a polymer to satisfy the requirements, it must also retain its elastomeric properties at sub-zero temperatures. Furthermore, the polymers should possess other desirable properties such as hydrolytic stability and fuel resistance. In U.S. Pat. No. 3,846,376, issued to me on Nov. 5, 1975, polymers are disclosed that go a long way toward fulfilling the aforementioned need. A bisaminophenol compound is condensed with a diimidate ester in synthesizing the polymers that have a glass transition temperature (Tg) of about −20° C (−4° F). Since the Tg of a polymer is an idication of the temperature at which it retains its elastomeric property, the need still exists for polymers having even lower glass transition temperatures.

It is an object of this invention, therefore, to provide monomers that can be used in the synthesis of thermally stable polymers having low glass transition temperatures.

Another object of the invention is to provide novel fluorocarbon ether bis(o-aminophenol) compounds.

A further object of the invention is to provide a process for preparing the bisaminophenol compounds.

Other objects and advantages of the invention will become apparent to those skilled in the art upon consideration of the accompanying disclosure.

SUMMARY OF THE INVENTION

The present invention resides in a bis(O-aminophenol) compound selected from the group consisting of (1) 1,14-bis(3-amino-4-hydroxyphenyl)perfluror-5,10-dimethyl-3,6,9,12-tetraoxatetradecane and (2) 1,17-bis(3-amino-4-hydroxyphenyl)perfluoro-3,6,9,15-tetraoxaheptadecane. The compounds can also be represented by the following formula:

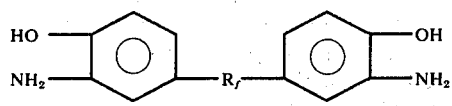

in which $R_f$ is

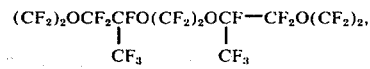

or $(CF_2)_2O(CF_2)_2O(CF_2)_2O(CF_2)_5O(CF_2)_2$.

In one embodiment, the invention lies in what can be termed a 3-stage process for synthesizing the fluorocarbon ether bis(o-aminophenol) compounds. The first stage of the process involves reacting 4-iodophenyl acetate with 1,14-diiodoperfluoro-5,10-dimethyl-3,6,9,12-tetraoxatetradecane or 1,17-diiodoperfluoro-3,6,9,15-tetraoxatetradecane. The reaction is carried out in N,N-dimethylformamide in the presence of copper bronze. The mole ratio of the acetate to the fluorocarbon ether diiodide is at least 2 to 1, e.g., from 2 to 5:1. For every mole of the fluorocarbon ether diiodide at least 4 gram atoms of copper bronze are utilized. For example, for each mole of the ether diiodide about 4 to 20 gram atoms of copper bronze are added to the reaction mixture. In carrying out the reaction, it is important that the temperature does not exceed 120° C. It is usually preferred to conduct the reaction at a temperature in the range of 110° to 120° C. The reaction period usually ranges from about 2 to 5 days although shorter and longer times can be employed. The 1,14-bis(4-diacetoxyphenyl)perfluoro-5,10-dimethyl-3,6,9,12-tetraoxadecane or 1,17-bis(4-acetoxyphenyl)perfluoro-3,6,9,15-tetraoxaheptadecane recovered as the product of the reaction (depending upon the particular ether diiodide starting material used) is hydrolyzed by refluxing for 15 minutes to 1 hour in a solution of concentrated hydrochloric acid in methanol.

In the second stage of the process, concentrated nitric acid is added to a solution of the product of the hydrolysis, i.e., 1,14-bis(4-hydroxyphenyl)perfluoro-5,10-dimethyl-3,6,9,12-tetraoxatetradecane or 1,17-bis(4-hydroxyphenyl)perfluoro-3,6,9,15-tetraoxaheptadecane, in glacial acetic acid. At least 2 moles, e.g., 2 to 4 moles, of nitric acid per mole of the aforementioned product are added to the solution. The resulting reaction is conducted at a temperature in the range of 43 to 45° C for a period of about 1 to 5 hours. It is critical that the reaction be carried out in this temperature range in order to avoid excess nitration.

In the third stage, the product of the second stage, i.e., 1,4-bis(3-nitro-4-hydroxyphenyl)perfluoro-5,10-dimethyl-3,6,9,12-tetraoxatetradecane of 1,17-bis(3-nitro-4-hydroxyphenyl)perfluoro-3,6,9,15-tetraoxaheptadecane, is dissolved in methanol. concentrated hydrochloric acid and a reduction catalyst, e.g., palladium supported on carbon, is then added to the solution. The amount of catalyst used generally falls in the range of about 2 to 15 weight percent of the aforementioned product. Catalytic reduction to the hydrochloride salt of the fluorocarbon ether bis(o-aminophenol) compound is accomplished by pressurizing the resulting mixture with hydrogen for a period of about 4 to 12 hours. Treatment of the hydrochloride salt with sodium bicarbonate yields the products of the invention.

The reactions involved in the above-described steps of the process can be represented by the following equations:

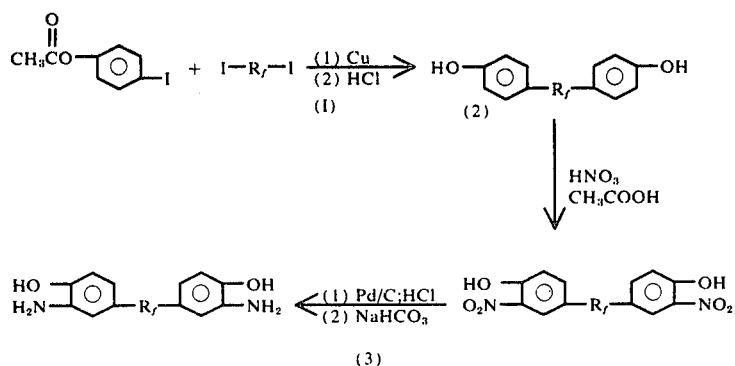

In the above equations in which the numerals designate the stages of the process, $R_f$ represents the following:

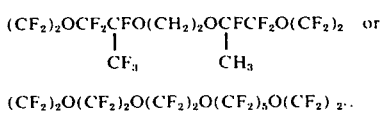

$$(CF_2)_2O(CF_2)_2O(CF_2)_2O(CF_2)_2O(CF_2)_2$$

The compounds of this invention are useful as monomers in preparing thermally stable perfluoroalkylene ether bibenzoxazole polymers having superior low temperature viscoelastic properties. The polymers are sybthesized by the polycondensation of at least one of the fluorocarbon ether bis(o-aminophenol) monomers with a long chain fluorocarbon ether diimidate ester. A more complete discussion of the synthesis of the polymers is contained in my copending application Serial No. 610,474, filed on September 4, 1975, the disclosure of which is incorporated herein by reference.

A more comprehensive understanding of the invention can be obtained by referring to the following illustrative examples which are not intended, however, to be unduly limitative of the invention. In Examples I and II, runs are described in which the intermediates used in Examples III and IV are prepared.

EXAMPLE I

Preparation of 1,14-diiodoperfluoro-5,10-dimethyl-3,6,9,12-tetraoxatetradecane (I)

Oxalyl fluoride (100 g, 1.06 mole) was added slowly through a vacuum manifold to a slurry of CsF (15g, 0.10 mole) in tetraglyme (150ml) at such a rate that the temperature of the reaction mass did not exceed 40° C. After all the oxalyl fluoride had been added, the mixture was cooled at −10° to 0° C and hexafluoropropylene oxide was added. A long induction period was noticed before significant reduction of the pressure of hexafluoropropylene oxide was observed.

Hexafluoropropylene oxide was added as needed at a 700 mm Hg total pressure. The reaction was terminated when a total of 300 g hexafluoropropylene oxide had been added. The reaction mass was allowed to warm to room temperature and the product was separated as the heavy phase. Distillation of the heavy phase yielded 95 g of the desired intermediate, FCOCF(CF₃)O(CF₂)₂OCF(CF₃)COF, b.p. 102°–103° C.

Dry potassium fluoride (18 g, 0.3 mole) and tetraglyme (100 ml) were placed in a Fischer-Porter pressure bottle and the bottle evacuated. The intermediate, FCOCF(CF₃)O(CF₂)₂OCF(CF₃)COF, (41.0 g; 0.096 mole) was added through a syringe and the mixture stirred for 60 minutes. The mixture was cooled in ice and ICl(43 g; 0.27 mole) was added slowly through a syringe. After the exothermic reaction subsided, the mixture was stirred at room temperature for 30 minutes. The contents of the reactor were frozen in liquid oxygen, the reactor was evacuated, and tetrafluoroethylene (0.07 mole) was added. After warming up to room temperature, the mixture was stirred over night during which time the pressure dropped from 40 psi to essentially zero. Additional tetrafluoroethylene was added and the stirring was continued. This procedure was repeated several times until 0.22 mole of tetrafluoroethylene had been added. After this the take-up of tetrafluoroethylene was negligible.

The gases were vented off and the reaction mixture was poured into water. The excess of iodine was destroyed with Na₂S₂O₃ after which the crude product was washed with aqueous NaHCO₃ and extracted with trifluorotrichloroethane.

Distillation gave 19.0 g of product (I) (21.0% yield), b.p. 76°–78° C/0.5 mm and 97.7% purity by gas chromatography. The structure was verified by infrared and nuclear magnetic resonance spectroscopy.

EXAMPLE II

Preparation of 1,17-diiodoperfluoro-3,6,9,15-tetraoxaheptadecane (II)

Hexafluoroglutaryl fluoride (215 g; 0.88 mole) was added to a slurry of CsF (5 g, 0.033 mole) in tetraglyme (100 ml) and the mixture was stirred at 35° C for one-half hour. The mixture was cooled to −10° to 0° c, and tetrafluoroethylene oxide was added through a vacuum manifold under a total pressure of 400–500 mm Hg. The reaction was monitored by frequent sampling and gas chromatography analysis and it was terminated when 220 g (1.9 mole) of tetrafluoroethylene oxide had been added. After warmin up to room temperature, the reaction product was separated from the solvent as the heavy phase (395 g). Distillation of the heavy phase gave 208 g of the desired intermediate, FOC(CF₂)₄O(CF₂)₂OCF₂COF, b.p. 136–139° C.

The intermediate, FOC(CF₂)₄O(CF₂)₂OCF ₂COF, (51 g; 0.1 mole) was added to a slurry of KF (12 g; 0.2 mole) in tetraglyme (100 ml) in a Fischer-Porter pressure bottle. The mixture was cooled in an ice-water bath and ICl (32 g; 0.2 mole) was added with vigorous stirring. After warming up to room temperature, the reaction vessel was connected to a tetrafluoroethylene cylinder and tetrafluoroethylene was added at 60 psi until the take up of tetrafluoroethylene was negligible (8 days).

The volatile products were removed under vacuum and the crude reaction mixture was poured into water, the excess of oidine destroyed with $Na_2S_2O_3$ solution, and the product extracted with trifluorotrichloroethane.

Distillation gave 11.6 g of the pure diiode product (II), b.p. 90°–95° C/0.2 mm in 12.0% conversion. The structure of the diiodide was verified by infrared and nuclear magnetic resonance spectroscopy.

EXAMPLE III a. 1,14-Bis (4-hydroxyphenyl)perfluoro-5,10-dimethyl-3,6,9,12-tetraoxatetradecane (III)

To a solution of 4-iodophenyl acetate (7.86 g, 0.030 mole) and 1,14-diiodoerfluoro-5,10-dimethyl-3,6,9,12-tetraoxatetradecane (9.20 g, 0.010 mole) in 45 ml of N,N-dimethylformamide was added copper bronze (5.08 g, 0.080 g atom). This slurry was stirred under nitrogen at 115°–117° C for 96 hours. The cooled reaction mixture was added to a stirred mixture of 150 ml of ether and 200 ml of water. The cuprous salts and excess copper were filtered off and the ether layer was washed repeatedly with water until free from the reaction solvent. The ethereal solution was evaporated to dryness to give a brown oil which was refluxed in 20 ml of acetic anhydride for 15 minutes. The excess acetic anhydride was distilled off and the residue was distilled under reduced pressure to give 3.40 g of 1,14-bis (4-acetoxyphenyl)perfluoro-5,10-dimethyl-3,6,9,12-tetraoxatetradecane, b.p. 180°–185° C/0.30 mm. This water-white oil was refluxed for an hour in a solution of 10 ml of concentrated hydrochloric acid (0.12 mole) in 100 ml of methanol. The solvent was evaporated under reduced pressure and the resultant tan residue was taken up in 600 ml of hexane. This solution was treated with charcoal, filtered, and reduced in volume to give 2.72 g (32% yield) of product (III) as a viscous water-white oil.

Analysis-Calc'd: C,33.90; H,1.12 Found: C,34.37; H,1.42

Molecular weight (mass spectroscopy): Calc'd: 850 Found: 850 b. 1,14-Bis(3-nitro-4-hydroxyphenyl)perfluoro-5,10-dimethyl-3,6,9,12-tetraoxatetradecane (IV)

To a solution of 1,14-bis(4-hydroxyphenyl)perfluoro-5,10-dimethyl-3,6,9,12-tetraoxatetradecane (2.61 g, 0.0030 mole) in 30 ml of glacial acetic acid was added 2.60 ml of concentrated nitric acid (0.041 mole). The pale yellow solution was stirred at 43°–45° C for four hours with care being taken to control any initial exotherms. The solution took on a deep red color which faded to pale orange as the reaction progressed to completion. The cooled reaction mixture was added to 200 ml of ice water and the produce extracted twice with 250 ml portions of ether. The combined ether solutions were washed repeatedly with water and finally with dilute sodium bicarbonate solution. The ethereal solution was dried over anhydrous magnesium sulfate and then reduced in volume to a viscous residue which was taken up in hot heptane. Distillation yielded 2.05 g (73% yield) of pale yellow product (IV) b.p. 180-184° C/0.15 mm.

Analysis-Calc'd: C,30.59; H,1.07; N,2.97 Found: C,30.51; H,0.89; N,2.80

Molecular weight (mass spectroscopy): Calc'd:940 Found: 940 c. 1,14-Bis (3-amino-4-hydroxyphenyl)perfluoro-5,10-dimethyl-3,6,9,12-tetraoxatetradecane (V)

A solution of 1,14-bis(3-nitro-4-hydroxyphenyl)perfluoro-5,10-dimethyl-3,6,9,12-tetraoxatetradecane (1.80 g, 0.0020 mole) in 150 ml of methanol was deoxygenated by passing nitrogen through the boiling solution for 15 minutes. Concentrated hydrochloric acid (10 ml, 0.12 mole) and 10% Pd/C (0.20 g) were added to the cooled solution and the catalytic reduction was run at room temperature and 50 psi of hydrogen for 6 hours. The catalyst was filtered off and the water white solution reduced to dryness under water aspirator pressure. The white resiude was slurried in a water-ether mixture. After careful neutralization with solid sodium bicarbonate, the product dissolved in the ether layer which was washed several times with water, dried over magnesium sulfate and evaporated to dryness. The soluble portion of the filtrate was taken up in 1800 ml of boiling hexane, the solution treated with charcoal and reduced in volume to 600 ml to give upon cooling 0.9 g (50% yield) of slightly off-white product (V), m.p. 55°–58° C.

Analysis-Calc'd: C,32.75; H,1,37; N,3.18 Found: C,33.09;H,1.49; N,3.01

Molecular weight (mass spectroscopy): Calc'd: 880 Found: 880

EXAMPLE IV a. 1,17-Bis(4-hydroxyphenyl)perfluoro-3,6,9,15-tetraoxaheptadecane (VI)

4-Iodophenyl acetate (7.86 g, 0.030 mole), 1,17-diiodoperfluoro-3,6,9,15-tetraoxaheptadecane (9.68 g, 0.010 mole), and copper bronze (5.08 g, 0.080 g atom) were stirred together under nitrogen at 113°–117° C for 48 hours. The cooled reaction mixture was added to 200 ml of ether. The cuprous salts and excess copper were filtered off and washed on the frit with ether. The ethereal solution was washed several times with water to remove the reaction solvent, dried over anhydrous magnesium sulfate, and reduced in volume under reduced pressure to yield a brown oil. The oil was refluxed with 10 ml of acetic anhydride for 20 minutes and the excess acetic anhydride then distilled off under reduced pressure. Distillation of the residue yielded 4.53 g of 1,17-bis (4-acetoxyphenyl)perfluoro-3,6,9,15-tetraoxaheptadecane, b.p. 184°–189° C/0.10 mm.

The diacetate ester was hydrolyzed by refluxing for 30 minutes in a solution of 5 ml of concentrated hydrochloric acid (0.06 mole) in 100 ml of methanol. The solution was reduced in volume under reduced pressure to give a light tan oil which was taken up in 250 ml of hexane. Treatment of the solution with charcoal, followed by removal of the hexane under reduced pressure yielded 3.93 g (39% yield) of product (VI) in the form of a bright yellow oil.

Analysis-Calc'd: C,33.35; H,1.12 Found: C,33.17; H,1.66

Molecular weight (mass spectroscopy): Calc'd: 900 Found: 900 b.
1,17-Bis(3-nitro-4-hydroxyphenyl)perfluoro-3,6,9,15-tetraoxaheptadecane (VII)

A stirred solution of 1,17-bis(4-hydroxyphenyl)perfluoro-3,6,9,15-tetraoxaheptadecane (3.90 g, 0.0039 ml) in 50 ml of glacial acetic acid was treated at room temperature with 3.70 ml of concentrated nitric acid (0.060 mole). The pale yellow solution was stirred at 43°–45° C for 5 hours with care being taken to control any initial exotherms. The solution took on a deep red color which faded to yellow as the reaction progressed to completion. The cooled reaction mixture was added to 250 ml of ice water and the product extracted several times with 200 ml portions of ether. The combined ether solutions were washed several times with 200 ml portions of water and then with dilute sodium bicarbonate solution. The ethereal solution was dried over anhydrous magnesium sulfate and reduced in volume to a viscous oil which was taken up in hot hexane. Distillation yielded 3.10 g (79% yield) of product (VII) as a pale yellow oil, b.p. 190°–192° C/0.10 mm.

Analysis-Calc'd: C,30.32; H,0.82; N,2.83 Found: C,30.75; H,0.85; N,2.72

Molecular weight (mass spectroscopy): Calc'd: 990 Found: 990 c.
1,17-Bis(3-amino-4-hydroxyphenyl)perfluoro-3,6,9,15-tetraoxaheptadecane (VIII)

1,17-Bis(3-nitro-4-hydroxyphenyl)perfluoro-3,6,9,15-tetraoxaheptadecane (3.00 g, 0.0030 mole) was dissolved in 180 ml of methanol and the solution deoxygenated by passing nitrogen through the boiling solution for 15 minutes. Concentrated hydrochloric acid (20 ml, 0.23 mole) and 10% Pd/C (0.30 g) were cautiously added to the cooled solution and catalytic reduction to the desired product took place over night at 50 psi of hydrogen. The catalyst was filtered off and the clear white solution evaporated to dryness under reduced pressure to yield the slightly off-white dihydrochloride salt. It was stirred vigorously in a water-ether mixture which was treated carefully with solid sodium bicarbonate. The ether layer was washed several times with water, dried over magnesium sulfate and evaporated to dryness. The residue was recrystallized twice from approximately 1400 ml of heptane (charcoal) to yield 1.41 g (50% yield) of slightly off-white product (VIII), m.p. 92°–95° C.

Analysis-Calc'd: C,32.28; H,1.30; N,3.01 Found: C,32.82; H,1.59; N,3.13

Molecular (mass spectroscopy): Calc'd: 930 Found: 930

EXAMPLE V

A run was conducted in which a perfluoroalkylene ether bibenzoxazole polymer was synthesized by the polycondensation of the fluorocarbon ether bis(o-aminophenol) as prepared in Example III with a fluorocarbon ether diimidate ester. The reaction involved is shown by the following equation:

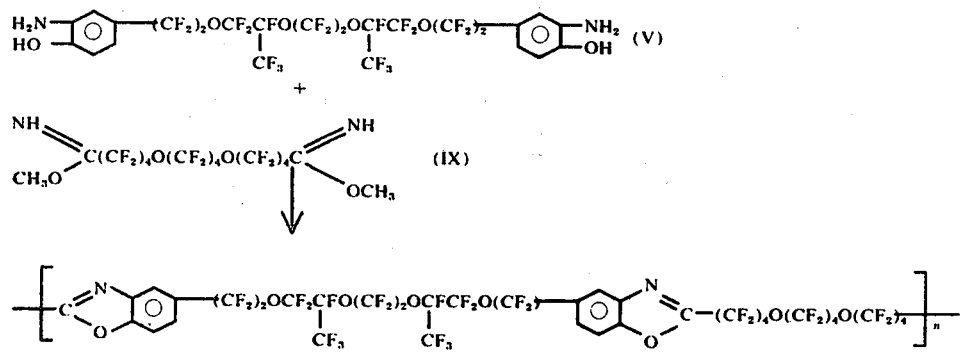

In carrying out the run, 3 ml of redistilled hexafluoroisopropanol was added to a mixture of (V) (0.441 g, 0.0005 mole) and (IX) (0.375g, 0.0005 mole). Glacial acetic acid (0.12 g, 0.002 mole) was added with stirring to the resulting clear amber solution. The polycondensation reaction was allowed to proceed under nitrogen for 18 days at 50° to 55° C at which time the viscous reaction mixture was poured into 100 ml of cold methanol (−78° C). The polymer was isolated by filtration, washed several times with cold methanol, redissolved in trifluorotrichloroethane and reprecipitated in cold methanol. Thorough washing of the polymer product with cold methanol followed by drying at 180° C and 0.05 mm Hg yielded 0.50 g (65% yield) of tough rubbery polymer. The polymer had an inherent viscosity of 0.41 dl/g in hexafluoroisopropanol at 25° C.

Analysis-calc'd: C,29.82; H,0.39; N,1.83 Found: C,30.17; H,0.35; H,1.66

Thermogravimetric analysis in air indicated an onset of breakdown at 425° C. Differential scanning calorimetry revealed a glass transition temperature of −25° C.

From the foregoing, it is seen that the compounds of this invention can be employed in preparing elastomeric polymers that can be used over a broad temperature range, e.g. as seals and sealants.

As will be evident to those skilled in the art, various modifications of the invention can be made in view of the foregoing disclosure without departing from the spirit and scope of the invention.

I claim:

1. As a new composition of matter, a compound selected from the group consisting of 1,14-bis(3-amino-4-hydroxyphenyl)perfluoro-5,10-dimethyl-3,6,9,12-tetraoxatetradecane and 1,17-bis(3-amino-4-hydroxyphenyl)perfluoro-3,6,9,15-tetraoxaheptadecane.

2. The composition of claim 1 in which the compound is 1,17-bis(3-amino-4-hydroxyphenyl)perfluoro-3,6,9,15-tetraoxaheptadecane.

3. 1,14-bis(3-amino-4-hydroxyphenyl)perfluoro-5,10-dimethyl-3,6,9,12-tetraoxatetradecane.

* * * * *